United States Patent
Shah

(10) Patent No.: US 9,578,016 B2
(45) Date of Patent: Feb. 21, 2017

(54) OPTIMIZING SECURE COMMUNICATIONS BETWEEN A CLIENT AUTHENTICATING SERVER AND A MOBILE CLIENT

(71) Applicant: Riverbed Technology, Inc., San Francisco, CA (US)

(72) Inventor: Paras Shah, Mountain View, CA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 52 days.

(21) Appl. No.: 14/334,205

(22) Filed: Jul. 17, 2014

(65) Prior Publication Data

US 2016/0021078 A1    Jan. 21, 2016

(51) Int. Cl.
*H04L 9/32*     (2006.01)
*H04L 29/06*    (2006.01)
*H04L 29/08*    (2006.01)

(52) U.S. Cl.
CPC ....... *H04L 63/0823* (2013.01); *H04L 63/0281* (2013.01); *H04L 63/0428* (2013.01); *H04L 67/02* (2013.01)

(58) Field of Classification Search
CPC ................................. H04L 63/061; H04L 9/08
USPC ......................................................... 713/171
See application file for complete search history.

(56) References Cited

U.S. PATENT DOCUMENTS

2009/0083538 A1*  3/2009  Merugu ............. H04L 63/0281
                                                       713/153
2010/0049970 A1*  2/2010  Fraleigh ............ H04L 63/0823
                                                       713/156

\* cited by examiner

*Primary Examiner* — Anthony Brown
(74) *Attorney, Agent, or Firm* — Park, Vaughan, Fleming & Dowler LLP; Laxman Sahasrabuddhe

(57) ABSTRACT

Systems and techniques are described for optimizing secure communications. Specifically, a first intermediary and a second intermediary can split-terminate a secure connection handshake or a handshake renegotiation between two computing devices. The first and second intermediaries can then optimize secure communications between the two computing devices.

13 Claims, 7 Drawing Sheets

OPTIMIZING SECURE COMMUNICATIONS BETWEEN A CLIENT AUTHENTICATING SERVER AND A MOBILE CLIENT

BACKGROUND

Technical Field

This disclosure relates to computer networking. More specifically, this disclosure relates to methods and apparatuses for optimizing secure communications between two computing devices, e.g., between a client authenticating server and a mobile client.

Related Art

Enterprise networks can include one or more wide-area networks (WANs) that interconnect offices that can be distributed over a large geographical area. Due to the popularity of mobile devices, it has become very important to provide support for mobile devices in enterprise networks. Improving performance of the enterprise network is important because it improves productivity, which in turn increases profitability of the organization.

Some enterprise networks use WAN optimization devices to improve network performance. WAN optimization devices optimize network traffic to improve WAN performance in reading and/or writing data over a network. Some WAN optimization devices monitor users' network traffic to attempt to predict data likely to be requested by users. This predicted data is prefetched over the WAN and cached by the WAN optimization devices at the users' respective network locations, so that this data can be quickly accessed by users if requested. WAN optimization devices also typically compress data (e.g., by performing de-duplication) to improve WAN performance. The WAN optimization devices' prefetching, caching, and compression helps mask the bandwidth and latency limitations of WANs from users.

WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers.

Techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is used to refer to such devices and applications and "WAN optimization" is used to refer to such techniques.

Optimizing secure communications is especially challenging because secure communications typically use encryption and/or authentication, which usually impedes operations such as prefetching, caching, and compression that are performed by WAN optimization devices.

SUMMARY

Some embodiments described herein provide systems and techniques for optimizing secure communications between a client and a server. In some embodiments, messages between the client (e.g., an application executing on a mobile device) and the server (e.g., a file or web server at a data center) pass through a client-side intermediary (e.g., a WAN optimization module executing on a mobile device) and a server-side intermediary (e.g., a WAN optimization device at a data center). The client-side intermediary can be added to a group of certificate authorities that are trusted by the client. Specifically, in some embodiments, the client-side intermediary is capable of injecting or adding itself into a repository of certificate authorities that the client trusts.

In some embodiments, a secure connection handshake can be split-terminated between the client and the server. Specifically, in some embodiments, split-terminating the secure connection handshake can involve the client-side intermediary performing the following operations: create a second digital certificate for the server based on a first digital certificate issued to the server by a certificate authority other than the client-side intermediary, complete a first secure connection handshake between the client and the client-side intermediary, create a certificate verification message that is encrypted using a private key associated with the client (note that the client-side intermediary is assumed to have access to the private key associated with the client), and send the certificate verification message to the server-side intermediary, thereby enabling the server-side intermediary to complete a second secure connection handshake between the server-side intermediary and the server.

In some embodiments, a secure connection handshake between the client and the server that does not require client authentication can be split-terminated. As part of split-terminating the secure connection handshake, a second digital certificate can be created for the server based on a first digital certificate issued to the server by a certificate authority other than the client-side intermediary. Next, a handshake renegotiation between the client and the server that requires client authentication can be split-terminate. Specifically, in some embodiments, split-terminating the handshake renegotiation can involve the client-side intermediary performing the following operations: complete a first handshake renegotiation between the client and the client-side intermediary, create a certificate verification message that is encrypted using a private key associated with the client (note that the client-side intermediary is assumed to have access to the private key associated with the client), and send the certificate verification message to the server-side intermediary, thereby enabling the server-side intermediary to complete a second handshake renegotiation between the server-side intermediary and the server.

In some embodiments, the client-side intermediary can be implemented as an executable that executes on a mobile device, e.g., a laptop computer. In these embodiments, the client-side intermediary can inject itself as a certificate authority into a repository of certificate authorities that the client (e.g., an application that executes on the laptop computer) trusts. Since the client-side intermediary executes on the same laptop as the client application, the client-side intermediary may also have access to a private key associated with the client. Note that the client-side intermediary executing on one laptop computer may not be able to inject itself as a trusted certificate authority on another laptop computer, and this inability can help thwart proxy attacks. Furthermore, note that embodiments described in this disclosure do not require the server-side intermediary to have access to the server's private key. Finally, embodiments described in this disclosure can reduce the amount of time required to complete the secure connection handshake over a WAN. Specifically, some embodiments described in this disclosure require approximately 1.5×the WAN round-triptime to complete the secure connection handshake (compared to 3×the WAN round-trip-time required by conventional techniques).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z.

According to one definition, a computer is any device that is capable of performing computations. In some embodiments, a computer can include a processing mechanism that is capable of executing instructions stored on a storage medium. Examples of computers include, but are not limited to, smartphones, handheld computers, laptop computers, desktop computers, distributed computers, printers, appliances, etc.

According to one definition, a network is an interconnection of one or more devices that is capable of delivering information from one computer to another computer. Examples of networks include, but are not limited to, wireless and wired networks, local area networks (LANs), metropolitan area networks (MANs), WANs, private networks, public networks, intranets, internets, etc.

According to one definition, a mobile device can generally be any computer that is likely to be physically moved to different locations. Examples of mobile devices include, but are not limited to, laptop computers, tablet computers, smartphones, and other handheld or wearable computing devices.

Figure 1:
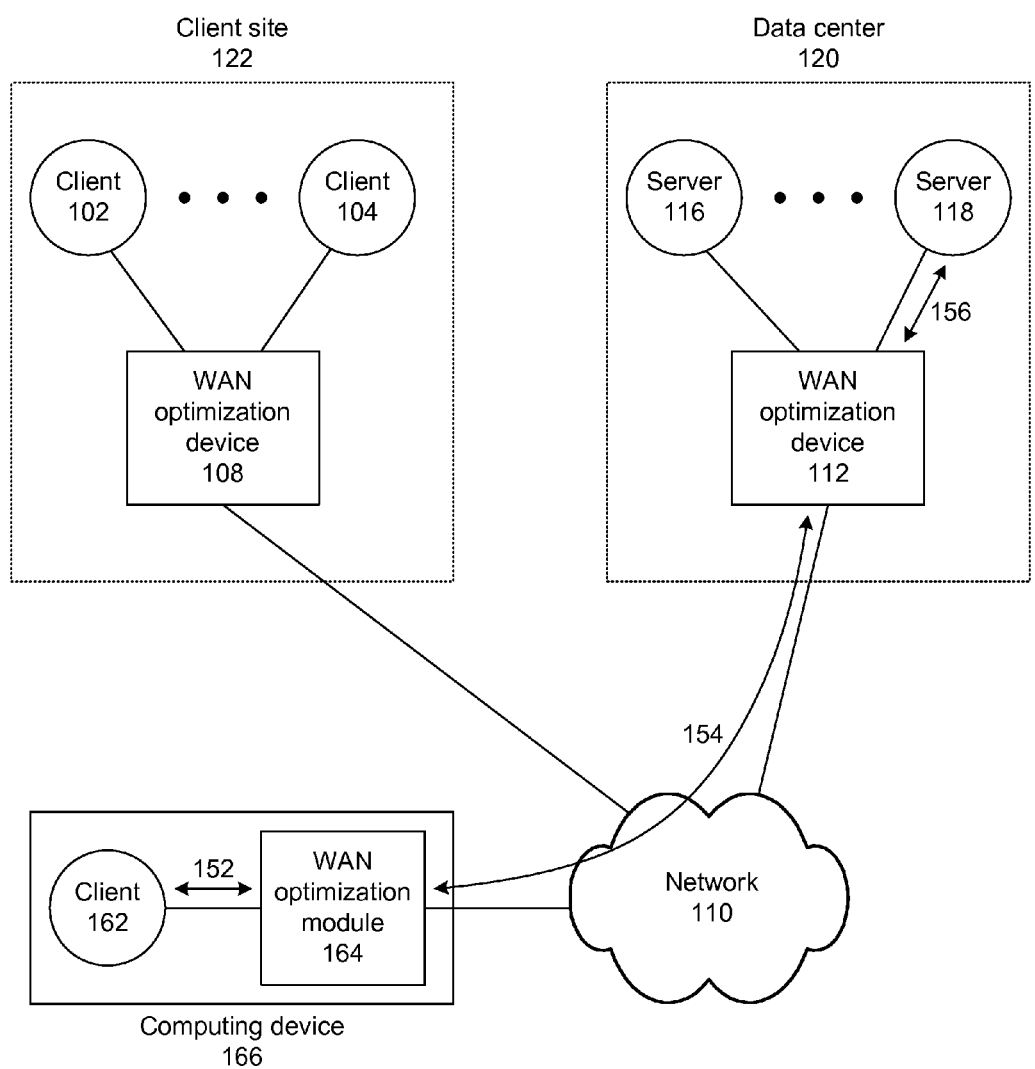
FIG. 1 illustrates an example of how a pair of WAN optimization devices can improve network performance in accordance with some embodiments described herein.

FIG. 1 illustrates an example of how a pair of WAN optimization devices can improve network performance in accordance with some embodiments described herein. Although some of the examples described in this disclosure are in the context of a WAN, the disclosed systems and techniques can generally be used to improve performance of any type of network.

Remote site 122 can be a company's headquarters or a company's regional office. Data center 120 can host servers and data storage systems for the company's enterprise network. Remote site 122 can include one or more clients 102-104 and WAN optimization device 108. Data center 120 can include one or more servers 116-118 and WAN optimization device 112. WAN optimization device 108 can communicate with WAN optimization device 112 over network 110, which can be any network, e.g., a wide area network. In some embodiments, computing device 166 may include a client, e.g., client 166, and a WAN optimization module, e.g., WAN optimization module 164. Client 166 and WAN optimization module 164 can be different processes that execute on computing device 166. Computing device 166 may be a mobile device that may generally be located anywhere, e.g., at client site 122, at data center 120, or outside client site 122 and data center 120. Computing device 166 may communicate with other computing devices via network 110. The number and types of devices shown in FIG. 1 are for illustration purposes only and are not intended to limit the scope of this disclosure. For example, in some embodiments, remote site 122 may include one or more routers and data center 120 may include one or more routers and/or load balancers that distribute network traffic between a set of network devices.

WAN optimization module 164 can establish connection 154 with WAN optimization device 112, and can use connection 154 to optimize at least some communications between clients 162 and servers 116-118. For example, WAN optimization module 164 and WAN optimization device 112 can intercept a connection between client 162 and server 116 and establish the following two connections: connection 152 between client 162 and WAN optimization module 164, and connection 156 between server 118 and WAN optimization device 112. The interception may be performed transparently, i.e., client 162 and server 118 may communicate with each other as if they had established an end-to-end connection without realizing that, in fact, the end-to-end connection was split into multiple connections by WAN optimization module 164 and WAN optimization device 112.

WAN optimization module 164 and WAN optimization device 112 can then use connections 152, 154, and 156 to optimize communications between client 162 and server 118. For example, data sent by client 162 to server 118 can be received at WAN optimization module 164. Next, WAN optimization module 164 can transform the data (e.g., by performing de-duplication) and send the transformed data to WAN optimization device 112 over connection 154. The transformation can significantly reduce the size of the data, thereby reducing the amount of bandwidth required to communicate the data over connection 154. WAN optimization device 112 can then perform an inverse transformation to recover the original data. The recovered original data can then be sent from WAN optimization device 112 to server 118. Likewise, in the return path (i.e., when server 118 sends data to client 162), data can be transformed by WAN optimization device 112 and the original data can be subsequently recovered by WAN optimization module 164.

In addition to reducing the amount of bandwidth required for communicating data over network 110, WAN optimization module 164 and WAN optimization device 112 can also reduce latency by, for example, performing intelligent prefetching. Specifically, WAN optimization module 164 can intelligently prefetch data from server 118 and provide the data to client 162 when WAN optimization module 164 intercepts a request for the data from client 162 to server 118. Performing intelligent prefetching can significantly reduce latency because the round trip time from client 162 to WAN optimization module 164 can be significantly smaller than the round trip time from client 162 to server 118.

It can be challenging to optimize secure network traffic, e.g., the network traffic between client 162 and server 118 when the client 162 and server 118 use a secure communication protocol to communicate with each other. Specifically, to optimize the network traffic, WAN optimization module 164 and WAN optimization device 112 may need to obtain the encryption key (e.g., the session key) that client 162 and server 118 are using to encrypt/decrypt the network traffic and/or to generate checksums.

WAN optimization devices 108 and 112 can also work together to optimize communications between computing devices in client site 122, e.g., clients 102-104, and computing devices in data center 120, e.g., servers 116-118. Some examples of how WAN optimization modules and/or devices can optimize secure network traffic are now described.

Figure 2A:
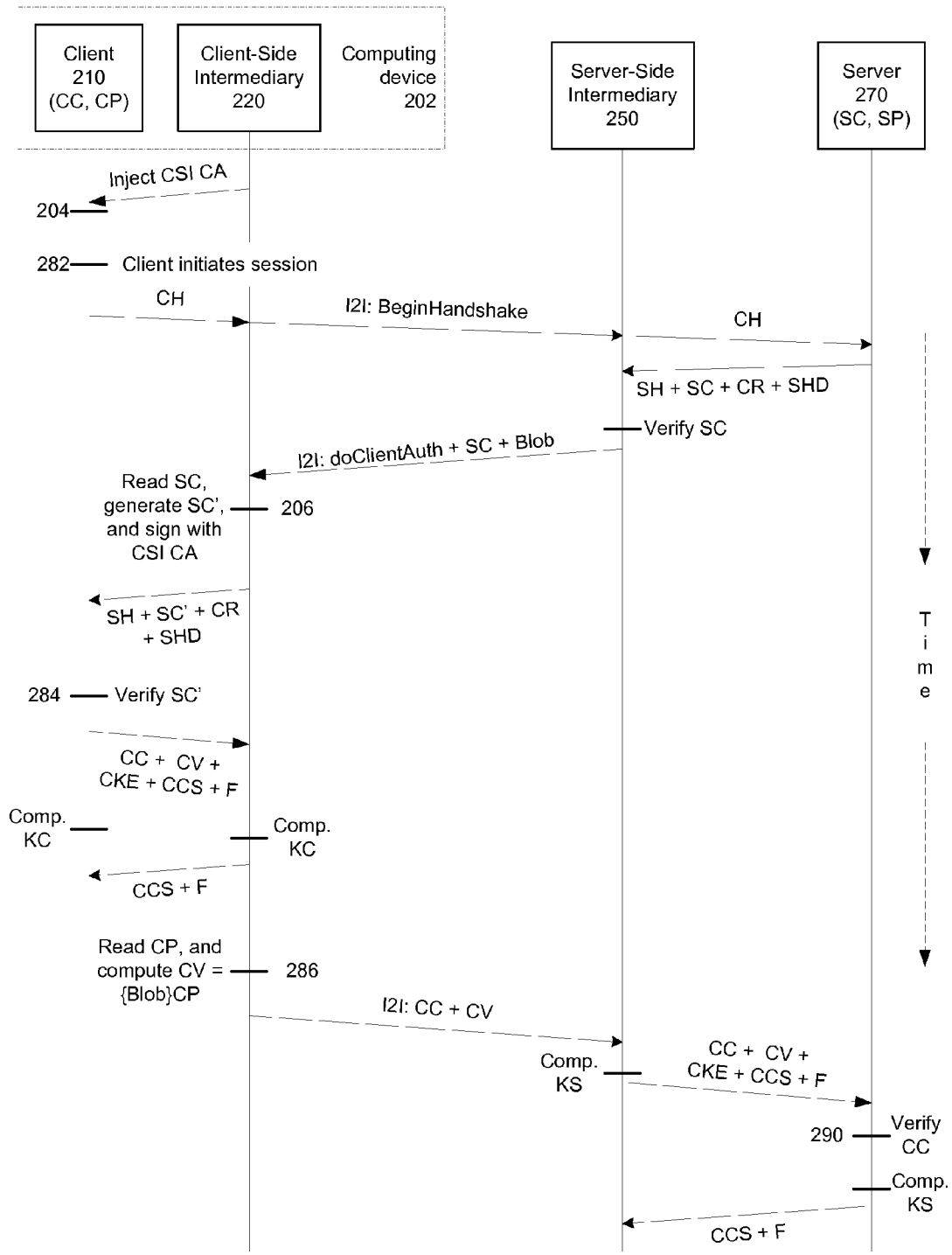
FIG. 2A illustrates a time sequence diagram for optimizing secure communications in accordance with some embodiments described herein.

FIG. 2A illustrates a time sequence diagram for optimizing secure communications in accordance with some embodiments described herein. In FIG. 2A, server 270 communicates with server-side intermediary (SSI) 250 (e.g., directly or via a LAN), SSI 250 communicates with client-side intermediary (CSI) 220 (e.g., via a WAN), and CSI 220 communicates with client 210. Server 270, SSI 250, CSI 220, client 210, and computing device 202 in FIG. 2A can correspond to server 118, WAN optimization device 250, WAN optimization module 164, client 162, and computing device 166 in FIG. 1, respectively. Note that client 210 and CSI 220 are co-located on computing device 202. For example, client 210 and CSI 220 can be implemented by two separate processes executing on computing device 202.

Server 270, client 210 and one or more of CSI 220 and SSI 250 may have access to Certificate Authority certificates with which they can authenticate a digital certificate proffered by an entity, e.g., the client and/or the server. For example, an organization that has deployed client 210 and server 270 may maintain a CA for issuing certificates to be used within the operating environment. In FIG. 2A, a digital certificate issued to client 210 is denoted by "CC," a digital certificate issued to server 270 is denoted by "SC," a private key belonging to client 210 is denoted by "CP," and a private key belonging to server 270 is denoted by "SP."

Before a secure communication handshake between client 210 and server 270 begins, CSI 220 injects itself as a trusted certificate authority "CSI CA" into client 210. In other words, after time sequence 204 (i.e., after certificate authority "CSI CA" has been injected into client 210), any certificates that are issued by CSI 220 will be accepted by client 210 as valid certificates.

At time sequence 282, the client initiates a secure communication connection with the server. For purposes of clarity, data exchanges between protocol layers up through the transport protocol layer (e.g., TCP) are omitted so that the discussion can be focused on the secure (e.g., SSL/TLS) handshaking process. After time sequence 282, or possibly in advance of time sequence 282, CSI 220 and SSI 250 establish a secure channel or tunnel between them, so as to protect communications exchanged across the WAN or other link that connects the intermediaries. In one implementation, the intermediaries employ TLS or SSL to establish a symmetric key, although in other implementations they may employ a different security scheme. A cryptographic key used by the intermediaries to encrypt/decrypt messages sent via the tunnel is represented herein as Ki. The tunnel may be used for intermediary communications for any number of client-server connections at any given time.

When the client initiates the secure connection, it issues a Client-Hello (CH) message toward the entity with which it wishes to communicate—server 270. The Client-Hello message can comprise a client seed (e.g., a 16 or 32 byte random number) that will be used during generation of a session key, and may also include other information, such as protocols/versions it supports, encryption and/or compression schemes it can employ, etc. The absence of curly braces "{" and "}" around the Client-Hello message indicates that the message is sent as clear text.

Upon receipt or interception of the Client-Hello message, CSI 220 notifies SSI 250 of the requested connection. This notification message is depicted as "I2I: BeginHandshake" in FIG. 2A, although it may simply comprise the Client-Hello message originated by client 210 (the term "I2I" refers to the fact that the message is communicated from one intermediary to another intermediary). In some embodiments, the "I2I: BeginHandshake" message may be encrypted with the intermediaries' shared key Ki. In these embodiments, SSI 250 decrypts the "I2I: BeginHandshake" message using Ki and extracts any necessary information, such as the client seed. As mentioned above, in some alternative embodiments of the invention, the CSI may simply forward the client's Client-Hello message in clear text.

Upon notification of the client connection request, SSI 250 may simply forward to the server the Client-Hello message originated by the client. Alternatively, the server-side intermediary may issue a new Client-Hello message formatted so as to appear to come directly from the client (e.g., using information contained in the original Client-Hello message and/or received from the client-side intermediary).

As mentioned above, the CH message from client 210 may include a list of protocols that are supported by client 210. In some embodiments, SSI 250 may create a new CH message that includes a list of protocols that is different from the list of protocols sent by client 210, and send the new list of protocols to server 270. In this manner, CSI 220 and SSI 250 can control the list of protocols that are used by client 210 and server 270, respectively, to setup the secure connection.

Server 270 can then respond with several messages/records, including a Server-Hello (SH) message, a Certificate message that includes a digital certificate (SC) issued to the server, a Certificate-Request (CR) message requesting the client's digital certificate, and a Server-Hello-Done (SHD) message. The SH message can include a server seed (e.g., another random number), and may include other information, such as the elected options for protocol/version/encryption/compression, etc. SSI 250 may verify server certificate SC to ensure it is actually communicating with the server, and not with an imposter.

SSI 250 can then send the following information to CSI 220: an "I2I: doClientAuth" message, SC, and information (depicted as "Blob" in FIG. 2A) that is required for generating the client Certificate-Verify message. Although not shown in FIG. 2A, the communication from SSI 250 to CSI 220 may be encrypted using a shared key, e.g., Ki. Next, CSI 220 can receive (and decrypt using shared key Ki if necessary) the communication from SSI 250. At time sequence 206, CSI 220 can read the server certificate SC to obtain the server certificate contents. Next, CSI 220 can generate a new server certificate SC' by signing the server certificate contents with CSI CA. For example, CSI 220 can digitally sign the server certificate contents using a private key associated with CSI CA to obtain new server certificate SC'.

CSI 220 can then send the following to client 210: Server-Hello (SH) message, a Certificate message that includes the new server certificate (SC'), a Certificate-Request (CR) message requesting the client's digital certificate, and a Server-Hello-Done (SHD) message. At time sequence 284, the client can verify the new server certificate (SC'). In some embodiments, when CSI 220 injects itself as a trusted certificate authority "CSI CA" into client 210, CSI 220 provides a public key associated with CSI CA to client 210. Recall that the new server certificate SC' was digitally signed by CSI 220 using the private key associated with CSI CA. Therefore, when client 210 receives the new server certificate SC' from CSI 220, client 210 can verify the certificate using the public key associated with CSI CA.

Assuming the client successfully verifies the server's identity, it continues with the operative communication protocol handshaking by composing and issuing a Certificate message comprising a copy of a digital certificate (CC) issued to the client by a suitable Certificate Authority. The client also issues a Client-Key-Exchange (CKE) message, a Certificate-Verify (CV) message, a Change-Cipher-Specification (CCS) message and a Finish (F) message. The CKE message comprises another secret (e.g., a Pre-Master-Secret) to be used in generating a session key, which is encrypted with the public key from the new server certificate SC'.

The CV message comprises a signature over the handshaking messages that have been exchanged by client 210 and server 270 up to this point, signed with the private client key that corresponds to client certificate CC. Validation of the CV message can verify that the operator of client 210 possesses the correct key and is likely to be a valid user.

In some scenarios, client 210 may be able to perform certain cryptographic operations (including participating in the handshaking process of FIG. 2A) while merely having control of or access to the private client key instead of actual possession. For example, the private key may be stored on a smartcard or similar device, and the client may be able to request the device to perform a particular operation (e.g., to sign the CV message).

The CCS message specifies that the communicants are to start encrypting their communications using a session key that is denoted herein as "KC". The Finished message signals that the handshaking is complete from the client's point of view, and comprises an encrypted hash over the preceding handshaking messages. Because all data needed to compute session key KC (i.e., client and server seeds, pre-Master-Secret) are now known to client 210, it may do so at this point (shown in FIG. 2A as "Comp. KC"). Note that CSI 220 also has all data needed to compute session key KC, and it may also do so at this point. Specifically, CSI 220 can obtain client and server seeds form the CH and SH messages, respectively, and can obtain the pre-Master-Secret by decrypting CKE using the private key associated with CSI CA. Once computed, session key KC can be used to encrypt communications between client 210 and CSI 220.

In addition, CSI 220 can decrypt CV with the public key of certificate CC, and verify that its contents are correct, and may check CC by referring to the issuing CA. If no errors are found, CSI 220 can send Change-Cipher-Specification (CCS) and Finish (F) messages toward client 210.

At time sequence 286, CSI 220 can read the private key (CP) associated with client 210 and compute the CV by encrypting "Blob" with the private key. Recall that "Blob" is the information that was received from SSI 250 and that is required for generating the client Certificate-Verify (CV) message. Next, CSI 220 can send the client certificate (CC) and the Certificate-Verify (CV) messages (depicted as "I2I: CC+CV") to SSI 250, thereby instructing SSI 250 to forward these messages to server 270.

SSI 250 can compute session key KS (shown in FIG. 2A as "Comp. KS") based on the client seed (obtained from the CH message), server seed (obtained from the SH message), and a pre-Master-Secret (which can be derived from the handshake messages exchanged so far between SSI 250 and server 270). Next, SSI 250 can send the following information to server 270: the digital certificate issued to the client (CC), Client-Key-Exchange (CKE) message, a Certificate-Verify (CV) message, a Change-Cipher-Specification (CCS) message and a Finish (F) message. The CKE message can comprise the Pre-Master-Secret to be used in generating the session key KS, wherein the Pre-Master-Secret is encrypted with the public key of server 270.

At time sequence 290, server 270 can verify client certificate CC and compute session key KS. Illustratively, server 270 can decrypt the CKE message (e.g., using its private cryptographic key, i.e., the private cryptographic key corresponding to certificate SC) and retrieve the pre-Master-Secret. Next, server 270 may compute session key KS using the necessary data gleaned from the handshaking messages and the pre-Master-Secret. Additionally, server 270 can decrypt CV with the public key of certificate CC and verify that its contents are correct, and may check CC by referring to the issuing CA. If no errors are found, server 270 can send Change-Cipher-Specification (CCS) and Finish (F) messages toward SSI 250.

In FIG. 2A, the secure connection between the client and the server may therefore be deemed split-terminated once the handshake illustrated in FIG. 2A has been completed, thereby enabling one or both intermediaries to read and manipulate (e.g., to optimize) communications exchanged between the client and the server. Once the handshake is complete, client 210 and server 270 may securely conduct transactions. Specifically, client 210 can encrypt messages using session key KC, and send the messages to CSI 220. CSI 220 can decrypt the messages using session key KC, and re-encrypt the message using shared key Ki that is shared between CSI 220 and SSI 250. SSI 250 can then decrypt the messages using shared key Ki, and re-encrypt the messages using session key KS, and send the encrypted messages to server 270. Finally, server 270 can decrypt the messages using session key KS. In the reverse path, communications from server 270 to client 210 can likewise be encrypted/decrypted using session key KS, shared key Ki, and session key KC.

In FIG. 2A, the illustrated sequence of directed vectors does not necessarily indicate exact timing and/or sequencing of the corresponding actions and messages. For example, a message received by one entity may not be immediately forwarded, but rather may be processed or manipulated in some manner before the next message in sequence is issued. In addition, the various actions (e.g., verifying a certificate, computing a session key) need not occur in the exact order illustrated in FIG. 2A. The handshaking process illustrated in FIG. 2A satisfies an applicable security protocol (e.g., TLS, SSL), and explicitly supports authentication of the client by the server, even while allowing a pair of network intermediaries to split-terminate and participate in the secure client-server connection (e.g., to optimize transactions).

In some embodiments, the initial handshake may be performed without client authentication. The time sequence diagram for such a handshake is similar to the one shown in FIG. 2A, except that the messages and processing required to authenticate the client are absent. For example, when the handshake is performed without client authentication, server 270 does not send a Certificate-Request (CR) message requesting the client's digital certificate. Additionally, at time sequence 290 in FIG. 2A, server 270 does not receive (and does not verify) the digital certificate issued to the client (CC). However, at a later point the server may want to renegotiate the handshake, and use client authentication during the renegotiation. For example, a website may have multiple webpages, and some webpages may require client authentication and some may not. When a client navigates from a webpage that does not require client authentication to a webpage that requires client authentication, the web server may initiate a handshake renegotiation. Some embodiments for optimizing secure communications in the presence of handshake renegotiation with client authentication are now discussed.

Figure 2B:
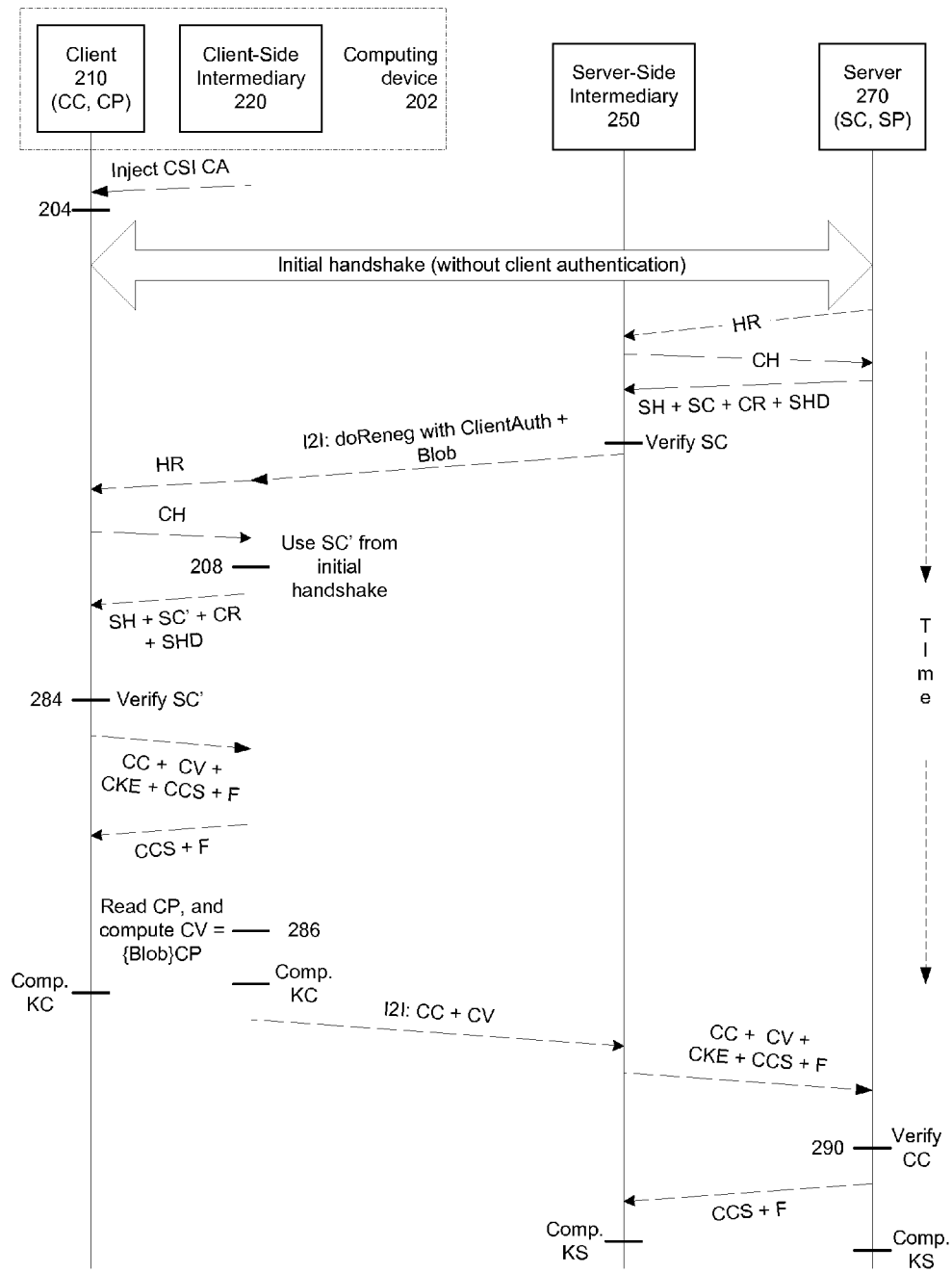
FIG. 2B illustrates a time sequence diagram for optimizing secure communications in accordance with some embodiments described herein.

FIG. 2B illustrates a time sequence diagram for optimizing secure communications in accordance with some embodiments described herein. As in FIG. 2A, CSI 220 injects itself as a trusted certificate authority "CSI CA" into client 210. In other words, after time sequence 204 (i.e., after certificate authority "CSI CA" has been injected into client 210), any certificates that are issued by CSI 220 will be accepted by client 210 as valid certificates. Next, client 210 and server 270 can perform a secure communication handshake without client authentication 212 (in some embodiments, this handshake is similar to the one shown in FIG. 2A, except that the messages and processing required to authenticate the client are absent). Next, server 270 may send a hello request (HR) message to client 210 that initiates handshake renegotiation with client authentication. The HR message can be transparently intercepted by SSI 250. SSI 250 can then send a CH message back to server 270, which, in turn, can respond with several messages/records including SH, SC, CR, and SHD. Next, SSI 250 can then send the following information to CSI 220: an "I2I: doReneg with ClientAuth" message (which instructs CSI 220 to renegotiate the handshake with client 210 and request authentication) and information (depicted as "Blob" in FIG. 2B) that is required for generating the client Certificate-Verify message.

CSI 220 can then send a HR message to client 210 and receive a CH message in response. At time sequence 208, CSI 220 can retrieve the new server certificate SC' that was generated during the initial handshake, and send the new server certificate SC' along with SH, CR, and SHD messages to client 210. At time sequence 284, client 210 can verify the new server message SC', and respond with several messages including a digital certificate (CC) issued to the client by a suitable Certificate Authority, a Client-Key-Exchange (CKE) message, a Certificate-Verify (CV) message, a Change-Cipher-Specification (CCS) message, and a Finish (F) message.

Next, as explained in reference to FIG. 2A, CSI 220 can send Change-Cipher-Specification (CCS) and Finish (F) messages toward client 210, and at time sequence 286, CSI 220 can read the private key (CP) associated with client 210 and compute the CV by encrypting "Blob" with the private key. Next, CSI 220 can send the client certificate (CC) and the Certificate-Verify (CV) messages (depicted as "I2I: CC+CV") to SSI 250, thereby instructing SSI 250 to forward these messages to server 270. Furthermore, SSI 250 can compute session key KS (shown in FIG. 2B as "Comp. KS") based on the client seed (obtained from the CH message), server seed (obtained from the SH message), and a pre-Master-Secret (which can be derived from the handshake messages exchanged so far between SSI 250 and server 270). Additionally, SSI 250 can send the following information to server 270: the digital certificate issued to the client (CC), Client-Key-Exchange (CKE) message, a Certificate-Verify (CV) message, a Change-Cipher-Specification (CCS) message and a Finish (F) message. The CKE message can comprise the Pre-Master-Secret to be used in generating the session key KS, wherein the Pre-Master-Secret is encrypted with the public key of server 270.

At time sequence 290, server 270 can verify client certificate CC and compute session key KS. Illustratively, server 270 can decrypt the CKE message (e.g., using its private cryptographic key, i.e., the private cryptographic key corresponding to certificate SC) and retrieve the pre-Master-Secret. Next, server 270 may compute session key KS using the necessary data gleaned from the handshaking messages and the pre-Master-Secret. Additionally, server 270 can decrypt CV with the public key of certificate CC and verify that its contents are correct, and may check CC by referring to the issuing CA. If no errors are found, server 270 can send Change-Cipher-Specification (CCS) and Finish (F) messages toward SSI 250.

Figure 2C:
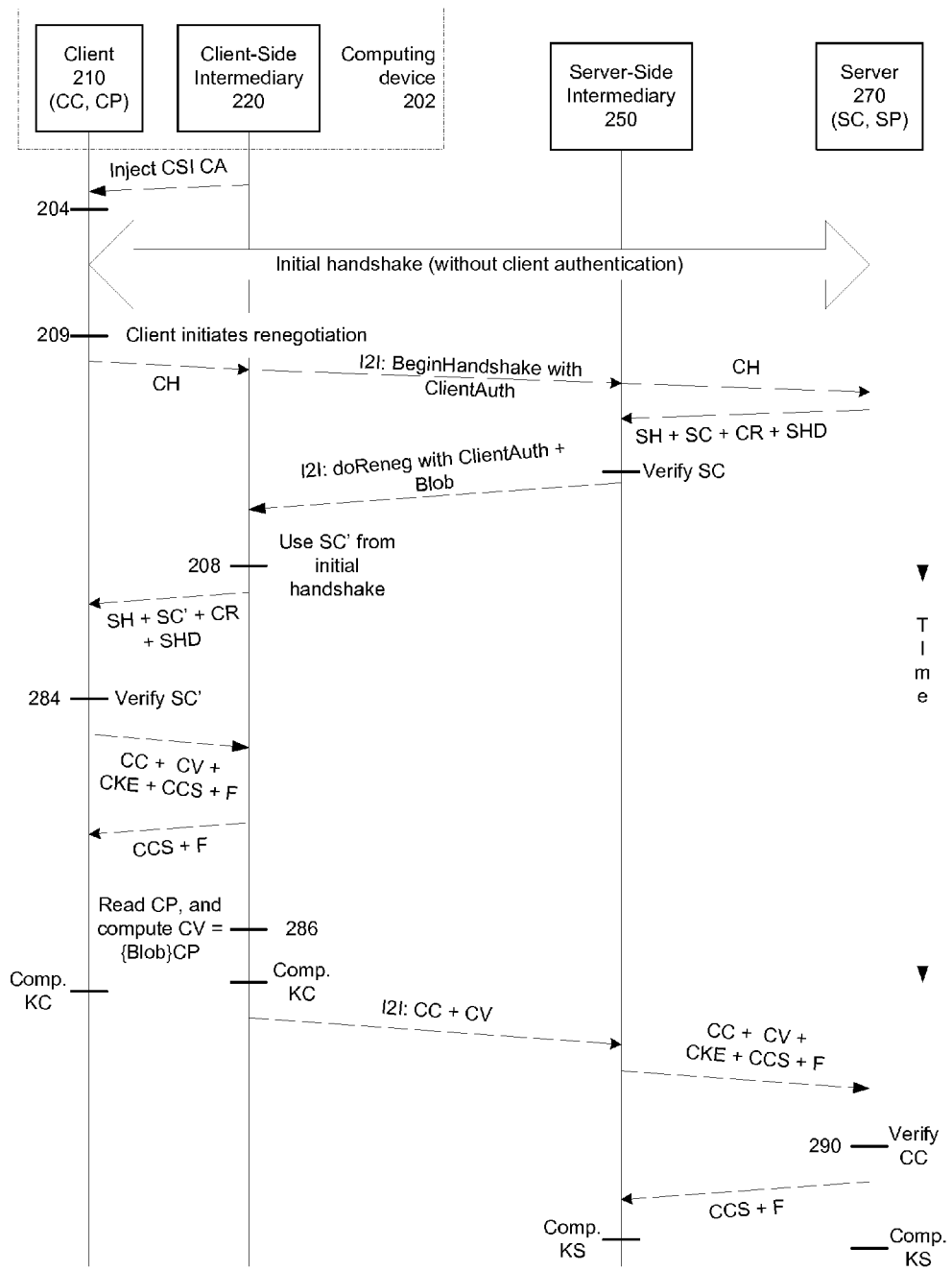
FIG. 2C illustrates a time sequence diagram for optimizing secure communications in accordance with some embodiments described herein.

In some embodiments, client 210 can initiate the renegotiation instead of server 270. For example, FIG. 2C illustrates a time sequence diagram for optimizing secure communications in accordance with some embodiments described herein. In FIG. 2C, at time sequence 209, client 210 initiates handshake renegotiation by sending a CH message to CSI 220. CSI 220 can then send the message "I2I: BeginHandshake with ClientAuth" to SSI 250, which instructs SSI 250 to renegotiate the handshake with server 270 with client authentication. The remainder of the time sequence diagram illustrated in FIG. 2C is similar to the time sequence diagram illustrated in FIG. 2A.

Figure 3A:
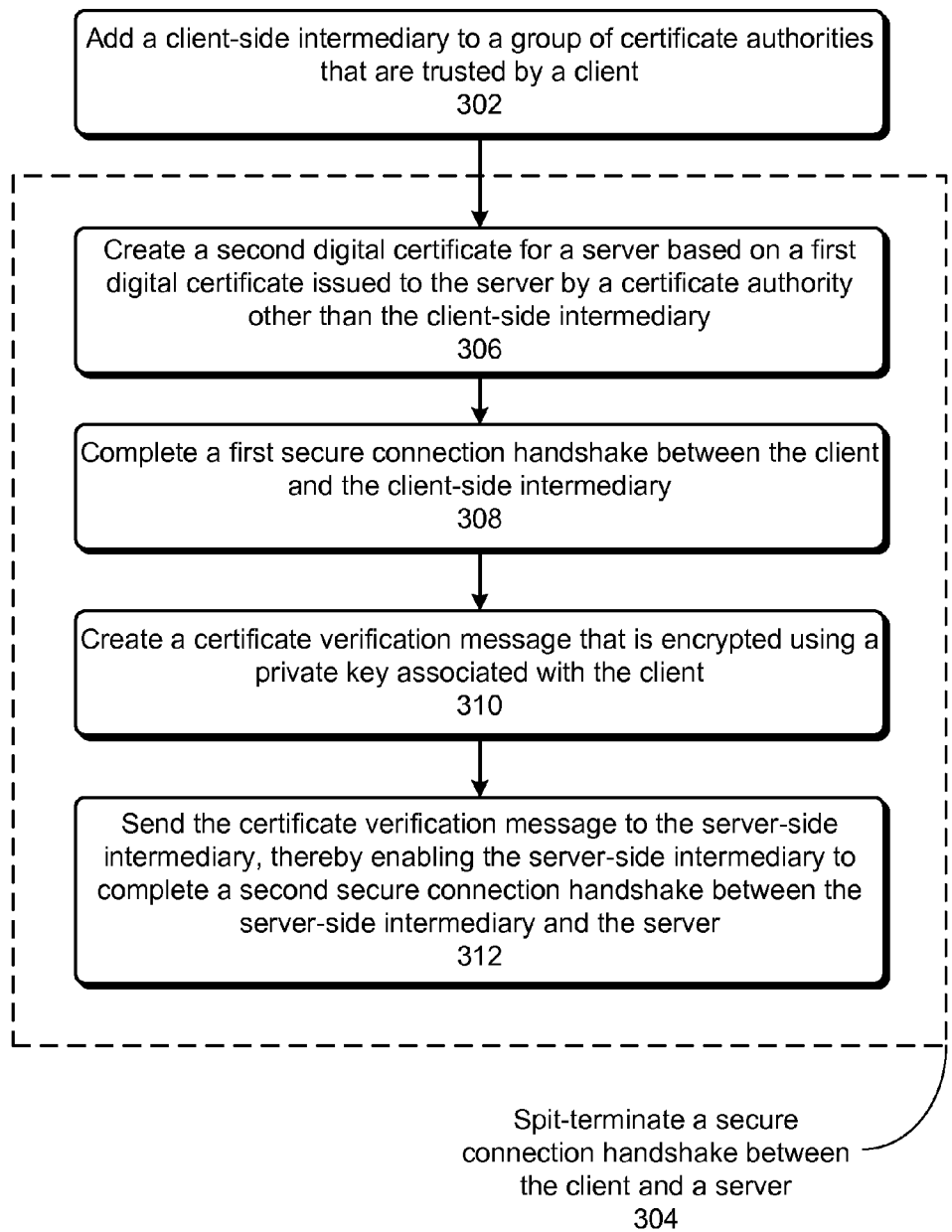
FIG. 3A illustrates a process for optimizing secure communications in accordance with some embodiments described herein.

FIG. 3A illustrates a process for optimizing secure communications in accordance with some embodiments described herein. Specifically, the process can optimize secure communications between a client and a server, wherein messages between the client and the server pass through a client-side intermediary and a server-side intermediary. The process can begin by adding the client-side intermediary to a group of certificate authorities that are trusted by the client (operation 302). Next, the process can split-terminate a secure connection handshake between the client and the server (operation 304).

Specifically, split-terminating the secure connection handshake can involve the client-side intermediary performing the following operations: create a second digital certificate for the server based on a first digital certificate issued to the server by a certificate authority other than the client-side intermediary (operation 306), complete a first secure connection handshake between the client and the client-side intermediary (operation 308), create a certificate verification message that is encrypted using a private key associated with the client (operation 310), and send the certificate verification message to the server-side intermediary, thereby enabling the server-side intermediary to complete a second secure connection handshake between the server-side intermediary and the server (operation 312). Note that the server-side intermediary does not require access to the server's private key, i.e., the embodiments disclosed herein can perform split-termination even if the server-side intermediary does not have access to the server's private key.

FIG. 2A illustrates a time sequence diagram that can correspond to an embodiment of the process illustrated in FIG. 3A. The sequence of operations shown in FIG. 3A is for illustration purposes only and is not intended to limit the scope of the disclosure. For example, in some embodiments, operation 308 may be performed after operations 310 and/or 312. In other embodiments, operation 308 may be performed concurrently with operations 310 and/or 312.

In some embodiments, the client-side intermediary can determine a session key based on information obtained during the first secure connection handshake, and use the session key to securely communicate with the client. Additionally, the server-side intermediary can determine a session key based on information obtained during the second secure connection handshake, and use the session key to securely communicate with the server. In some embodiments, the client-side intermediary is capable of adding itself to the group of certificate authorities that are trusted by the client, and has access to the private key associated with the client. In some embodiments, a secure connection is established between the client-side intermediary and the server-side intermediary. In some embodiments, the set of security protocols supported by the client is received (e.g., in the CH message). Next, the set of security protocols can be modified, and the modified set of security protocols can then be sent to the server. The modification of the set of security protocols can be performed by the client-side intermediary, the server-side intermediary, or some other device that is in the path from the client to the server.

Figure 3B:
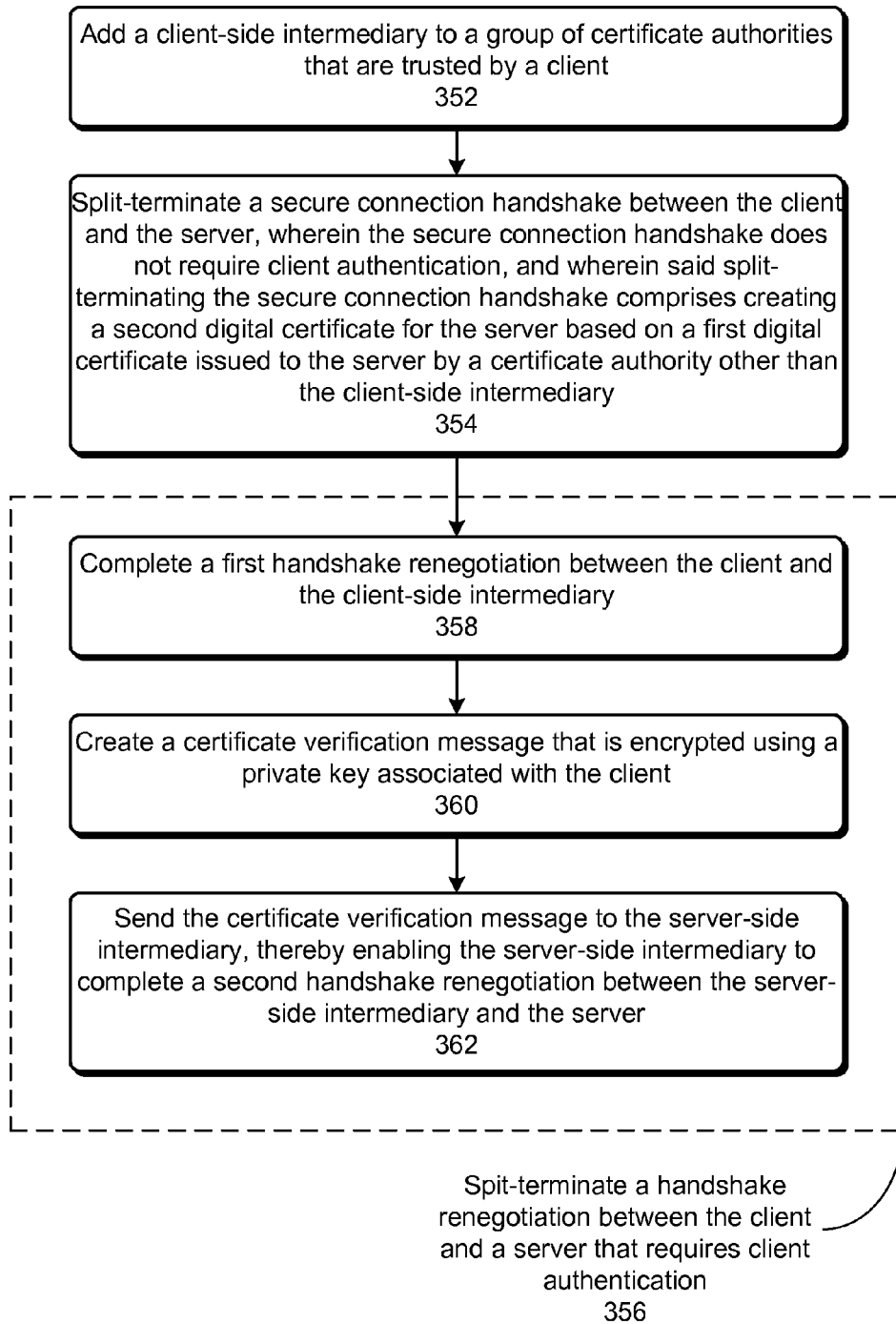
FIG. 3B illustrates a process for optimizing secure communications in accordance with some embodiments described herein.

FIG. 3B illustrates a process for optimizing secure communications in accordance with some embodiments described herein. Specifically, the process can optimize secure communications between a client and a server, wherein messages between the client and the server pass through a client-side intermediary and a server-side intermediary. The process can begin by adding the client-side intermediary to a group of certificate authorities that are trusted by the client (operation 352). Next, a secure connection handshake between the client and the server can be split-terminated, wherein the secure connection handshake does not require client authentication, and wherein said split-terminating the secure connection handshake comprises creating a second digital certificate for the server based on a first digital certificate issued to the server by a certificate authority other than the client-side intermediary (operation 354). Then, a handshake renegotiation between the client and a server that requires client authentication can be split-terminated (operation 356).

Specifically, split-terminating the handshake renegotiation can involve the client-side intermediary performing the following operations: complete a first handshake renegotiation between the client and the client-side intermediary (operation 358), create a certificate verification message that is encrypted using a private key associated with the client (operation 360), and send the certificate verification message to the server-side intermediary, thereby enabling the server-side intermediary to complete a second handshake renegotiation between the server-side intermediary and the server (operation 362). Note that the server-side intermediary does not require access to the server's private key, i.e., the embodiments disclosed herein can perform split-termination even if the server-side intermediary does not have access to the server's private key.

FIG. 2B illustrates a time sequence diagram that can correspond to an embodiment of the process illustrated in FIG. 3B. The sequence of operations shown in FIG. 3B is for illustration purposes only and is not intended to limit the scope of the disclosure. For example, in some embodiments, operation 358 may be performed after operations 360 and/or 362. In other embodiments, operation 358 may be performed concurrently with operations 360 and/or 362.

In some embodiments, the client-side intermediary can determine a session key based on information obtained during the first handshake renegotiation, and use the session key to securely communicate with the client. Additionally, the server-side intermediary can determine a session key based on information obtained during the second handshake renegotiation, and use the session key to securely communicate with the server. In some embodiments, the client-side intermediary is capable of adding itself to the group of certificate authorities that are trusted by the client, and has access to the private key associated with the client. In some embodiments, a secure connection is established between the client-side intermediary and the server-side intermediary.

Figure 4:
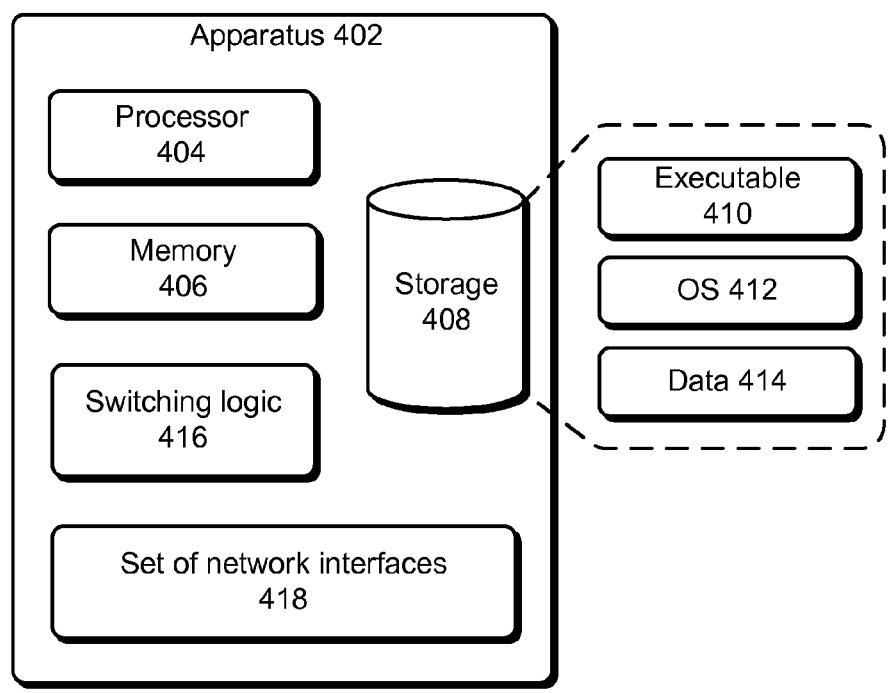
FIG. 4 illustrates an apparatus for optimizing secure communications in accordance with some embodiments described herein.

FIG. 4 illustrates an apparatus for optimizing network traffic in accordance with some embodiments described herein. Apparatus 402 comprises processor 404, memory 406 (e.g., a volatile or non-volatile random access memory), and storage 408 (e.g., a flash memory device or a disk drive). Storage 408 can store executable 410, operating system 412, and data 414. Apparatus 402 also includes switching logic 416 and set of network interfaces 418. The components in apparatus 402 can communicate with one another using a communication mechanism, e.g., a bus, a backplane, and/or a switching fabric.

Executable 410 can include instructions that, when executed by processor 404, cause apparatus 402 to perform one or more methods that are implicitly or explicitly described in this disclosure. Specifically, in some embodiments, executable 410 can include instructions for optimizing secure communications between two computing devices, e.g., a client and a server.

Data 414 can include any data that is inputted into or outputted by executable 410. Set of network interfaces 418 can be used to transmit data to and/or receive data from other communication devices. Switching logic 416 can forward network traffic received on one or more network interfaces in accordance with switching/routing information stored in apparatus 402.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing secure communications between a client and a server, wherein messages between the client and the server pass through a client-side intermediary and a server-side intermediary, the method comprising:
   adding the client-side intermediary to a group of certificate authorities that are trusted by the client;
   split-terminating a secure connection handshake between the client and the server, wherein said split-terminating comprises:
      the client-side intermediary creating a second digital certificate for the server based on a first digital certificate issued to the server by a certificate authority other than the client-side intermediary;
      the client-side intermediary completing a first secure connection handshake between the client and the client-side intermediary;
      the client-side intermediary determining a first session key based on information obtained during the first secure connection handshake;
      the client-side intermediary creating a certificate verification message that is encrypted using a private key associated with the client;
      the client side intermediary sending the certificate verification message to the server-side intermediary, thereby enabling the server-side intermediary to complete a second secure connection handshake between the server-side intermediary and the server; and
      the server-side intermediary determining a second session key based on information obtained during the second secure connection handshake;
   the client-side intermediary using the first session key to securely communicate with the client; and
   the server-side intermediary using the second session key to securely communicate with the server.

2. The method of claim 1, wherein said adding the client-side intermediary to the group of certificate authorities that are trusted by the client is performed by the client-side intermediary.

3. The method of claim 1, wherein the client-side intermediary has access to the private key associated with the client.

4. The method of claim 1, further comprising:
   establishing a secure connection between the client-side intermediary and the server-side intermediary.

5. The method of claim 1, wherein said split-terminating further comprises:
   receiving a set of security protocols supported by the client;
   modifying the set of security protocols by adding and/or removing one or more security protocols; and
   sending the modified set of security protocols to the server.

6. A method for optimizing secure communications between a client and a server, wherein messages between the client and the server pass through a client-side intermediary and a server-side intermediary, the method comprising:
   adding the client-side intermediary to a group of certificate authorities that are trusted by the client;
   split-terminating a secure connection handshake between the client and the server, wherein the secure connection handshake does not require client authentication, and wherein said split-terminating the secure connection handshake comprises creating a second digital certificate for the server based on a first digital certificate issued to the server by a certificate authority other than the client-side intermediary;
   split-terminating a handshake renegotiation between the client and the server, wherein the handshake renegotiation requires client authentication, and wherein said split-terminating the handshake renegotiation comprises:
      the client-side intermediary completing a first handshake renegotiation between the client and the client-side intermediary;
      the client-side intermediary determining a first session key based on information obtained during the first handshake renegotiation;
      the client-side intermediary creating a certificate verification message that is encrypted using a private key associated with the client;
      the client side intermediary sending the certificate verification message to the server-side intermediary, thereby enabling the server-side intermediary to complete a second handshake renegotiation between the server-side intermediary and the server; and
      the server-side intermediary determining a second session key based on information obtained during the second handshake renegotiation;
   the client-side intermediary using the first session key to securely communicate with the client; and
   the server-side intermediary using the second session key to securely communicate with the server.

7. The method of claim 6, wherein said adding the client-side intermediary to the group of certificate authorities that are trusted by the client is performed by the client-side intermediary.

8. The method of claim 6, wherein the client-side intermediary has access to the private key associated with the client.

9. The method of claim 6, further comprising:
establishing a secure connection between the client-side intermediary and the server-side intermediary.

10. A non-transitory computer-readable storage medium storing instructions that, when executed by a client-side intermediary, cause the client-side intermediary to perform a method for optimizing secure communications between a client and a server, wherein messages between the client and the server pass through the client-side intermediary and a server-side intermediary, the method comprising:
adding the client-side intermediary to a group of certificate authorities that are trusted by the client;
split-terminating a secure connection handshake between the client and the server, wherein said split-terminating comprises:
creating a second digital certificate for the server based on a first digital certificate issued to the server by a certificate authority other than the client-side intermediary;
completing a first secure connection handshake between the client and the client-side intermediary;
determining a first session key based on information obtained during the first secure connection handshake;
creating a certificate verification message that is encrypted using a private key associated with the client; and
sending the certificate verification message to the server-side intermediary, thereby: (1) enabling the server-side intermediary to complete a second secure connection handshake between the server-side intermediary and the server, (2) enabling the server-side intermediary to determine a second session key based on information obtained during the second handshake renegotiation, and (3) enabling the server-side intermediary to use the second session key to securely communicate with the server; and
using the first session key to securely communicate with the client.

11. The non-transitory computer-readable storage medium of claim 10, wherein the client-side intermediary has access to the private key associated with the client.

12. The non-transitory computer-readable storage medium of claim 10, wherein the method further comprising establishing a secure connection with the server-side intermediary.

13. The non-transitory computer-readable storage medium of claim 10, wherein said split-terminating further comprises:
receiving a set of security protocols supported by the client;
modifying the set of security protocols by adding and/or removing one or more security protocols; and
sending the modified set of security protocols to the server.

* * * * *